Feb. 17, 1970    H. HELD    3,496,567
AIRBORNE VERY LOW FREQUENCY RADIATOR
Filed May 9, 1962    3 Sheets-Sheet 1
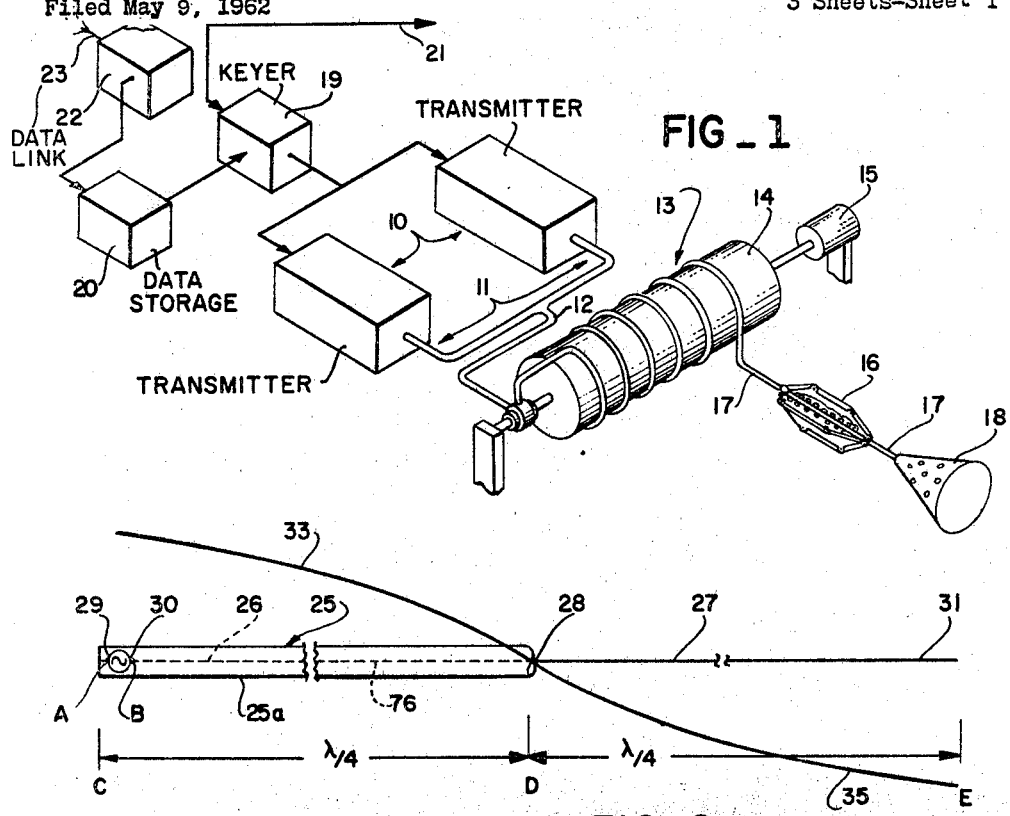
FIG_1
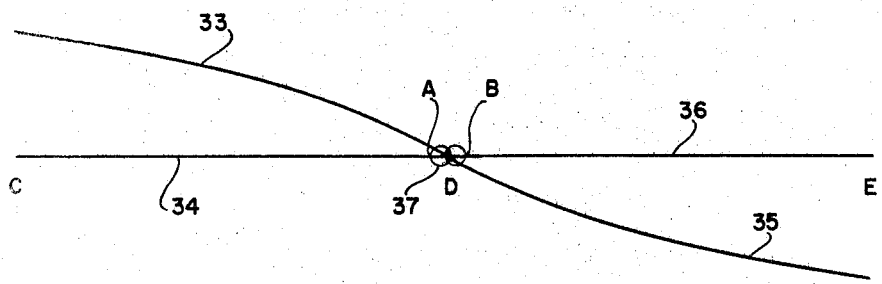
FIG_2
FIG_3
INVENTOR.
HAROLD HELD
BY
*George C. Sullivan*
Agent

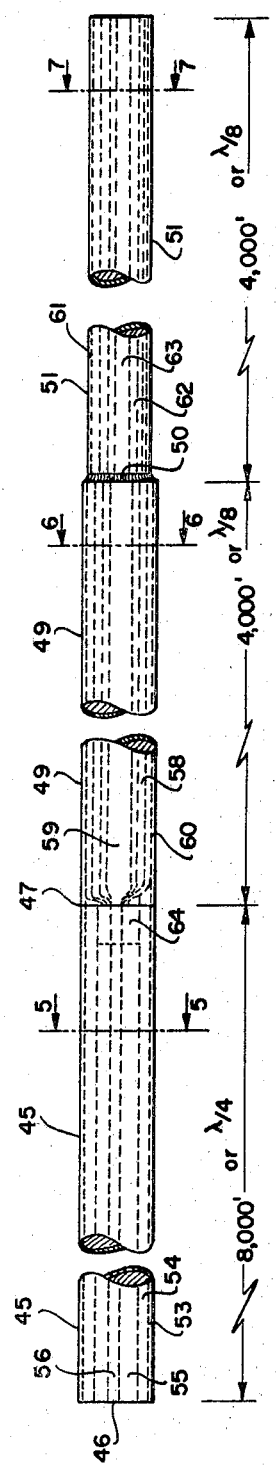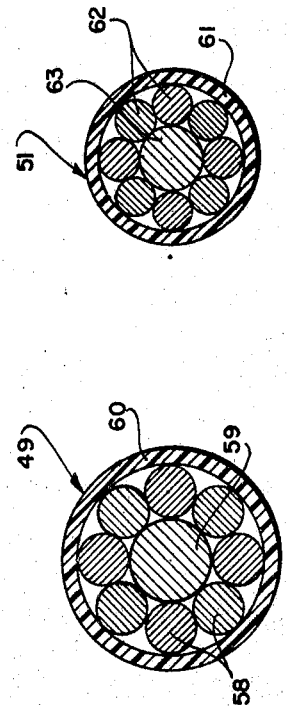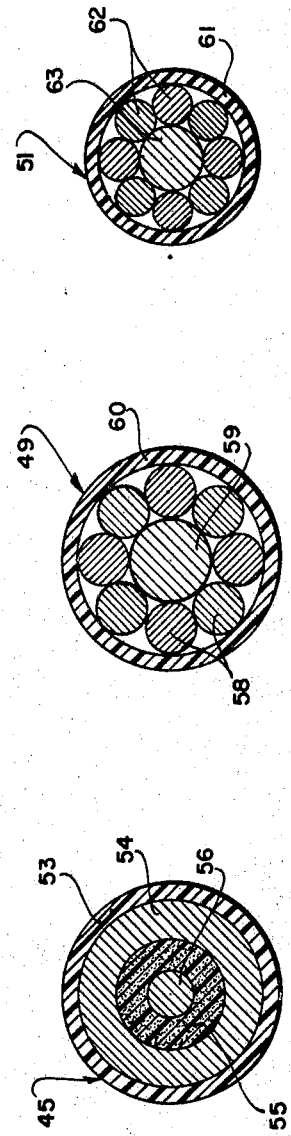
INVENTOR.
HAROLD HELD

Feb. 17, 1970 H. HELD 3,496,567
AIRBORNE VERY LOW FREQUENCY RADIATOR
Filed May 9, 1962 3 Sheets-Sheet 3

INVENTOR.
HAROLD HELD
BY
*George C. Sullivan*
Agent

United States Patent Office 3,496,567
Patented Feb. 17, 1970

3,496,567
AIRBORNE VERY LOW FREQUENCY RADIATOR
Harold Held, Reseda, Calif., assignor to Lockheed
Aircraft Corporation, Burbank, Calif.
Filed May 9, 1962, Ser. No. 193,630
Int. Cl. H01q 1/30, 9/30
U.S. Cl. 343—707                10 Claims

ABSTRACT OF THE DISCLOSURE

The disclosure describes a very low frequency half-wave dipole antenna structure adapted to be drogue-trailed behind an aircraft in flight and including a coaxial radiating section of one-quarter wavelength and a two part single wire radiating section.

---

This invention relates to means for the radiation of very low frequency radio waves and in particular to an airborne radiator for the very low frequency range.

The vagaries of transmission paths for radio waves are well-known and result in a considerable variation in the propagation of signals which may be received reliably at all times in all of the areas at which such signals are intended to be received. For example, the attenuation of radio waves between 400 and 1500 kilocycles during the daytime is such that operation in that band would require excessive power. The limitation of distance by the horizon makes frequencies above 30 megacycles unusable except under certain infrequent atmospheric "openings." The choice therefore lies between the band below 400 kilocycles or that between 1500 and 30,000 kilocycles. Of the two bands, the higher is attractive for the relatively low cost of high-efficiency antenna structures, because long distances can be traversed with low power, and static levels are low. There are, however, a number of other considerations involved in the selection of transmitting frequencies for reliable communication purposes. There must be transmission capability at long distance and the signals must be receivable with as little noise as possible throughout the world. Since for each distance there is an optimum high frequency below which the attenuation increases excessively and above which the frequency "skips" (i.e., does not return to earth at that point), simultaneous transmission on several frequencies would be required. Moreover, it would be necessary to change frequencies with the time of day and season of the year.

Another disadvantage of high frequencies for reliable communication is their susceptibility to rapid fading. Automatic gain control in receivers can be used to compensate for slow fading but not for rapid variations. High-frequency transmissions reflected from the ionosphere are accompanied by rotation of the polarization of the radio waves that may have undesirable effect for certain communication purposes. The characteristic of high frequencies that prevails most against their use is their susceptibility to fade-outs. Fade-outs are due to electric disturbances associated with the aurora borealis which is frequently present at the high latitudes over which many of the world's long-distance routes operate. They occur with annoying frequency, often lasting for long periods of time and frequently get into the lower latitudes. The severity of such disturbances when they occur make communication impossible. There are also periods when in the absence of such disturbances the strength of signals is so low and erratic as to render for them useless communication. While these periods vary from year to year, they average aproximately 15 percent of the total time.

The need for reliability of communication cannot be met with the use of high frequencies. From data accumulated over a period of years it has been shown that frequencies between 10 and 150 kilocycles are quite stable except for certain climatic and seasonal variations. There are no well-defined skip distances for frequencies between 10 and 150 kilocycles and all fading is gradual. Decreases in signal strength occur when the sunset line on earth is midway between the transmitting and receiving station, but the duration is very short. Electric disturbances cause a decrease in the night signal strength, but only to the point where it is approximately equal to the normal daylight strength. The disturbances actually produce an increase in the daylight signal strength. Clearly, then the lower frequencies possess decided advantages for reliable world-wide communication.

The characteristic most desired of long-distance transmission is that over the long distances where it is to give service, it must be highly reliable. Reliability means, of course, that there will be present at all times a signal of sufficiently high field strength. Having decided the portion of the radio spectrum most desirable, the production of a sufficient field strength at considerable distances involves considerations of transmitter power and radiating-system structure.

The present invention contemplates a novel transmitting system for radiating low frequency radio waves from an aircraft. In particular the antenna structure used herein is novel. For the very low frequencies the ratio of antenna length to aircraft surface area is sufficiently large to minimize the effect of the aircraft as a ground plane component of the radiating element. In a practical embodiment, for a representative very low frequency (VLF) of 30 kilocycles one-half wavelength is approximately 16,000 feet. If an airborne vehicle trailing such an antenna flies at a height such that the antenna height is greater than ½ wavelength the radiation from the antenna approached a free space propagation condition to achieve a very high efficiency radiating system.

The unique features of the radiating system of the invention involve a structure in which an antenna ½ wavelength long includes a radiating section ¼ wavelength long continuing from the inner conductor at the open end of a coaxial transmission line section ¼ wave length long at the propagating frequency and closed at the other end. Because of the great length of such an antenna at the representative frequency of 30 kc. the aircraft carrying the radiator is a small enclosure which contains the high power radio frequency generator driving a low impedance transmission line. The outer shield conductor of the coaxial transmission line is continuous with the aircraft enclosure. The ¼ wave antenna and coaxial transmission line section load the transmission line as a center-fed half-wave dipole radiator. The transmission line impedance of approximately 70 ohms is properly matched by the dipole radiator thus formed. The normal impedance of a half-wave dipole radiator is approximately 70 ohms. The coupling of the sections of the dipole and coaxial transmission line and certain other features thereof are novel. For example, in the above described structure—a coaxial element of one diameter is followed by a smaller single wire element, followed in turn by the single wire element of still smaller diameter. This forms in effect an airfoil so that it will tend to remain stretched out horizontally from the flying aircraft. An aerodynamic drogue attached at the very end of the antenna structure of the invention aids in maintaining the lift characteristics.

It is therefore an object of this invention to provide a highly efficient very low frequency radiating system and antenna which may be airborne.

It is another object of the invention to provide an extremely long antenna structure of novel configuration including a coaxial transmission line and a single wire radiating element so constructed as to provide a center fed half-wave dipole in effect.

It is a further object of this invention to provide a very low frequency airborne radiating structure wherein the generator which excites the radiating structure is effectively within the shell of a coaxial transmission line, the aircraft forming a part of the outer conductor of the transmission line structure.

It is still another object of this invention to provide an airborne antenna for very low frequency radio signals which by virtue of its structure has aerodynamic characteristics.

It is a still further object of the invention to provide a very low frequency airborne antenna wherein low impedance transmission line is driven by a generator which is effectively within the transmission line.

It is yet another object of the invention to provide a very low frequency airborne dipole antenna structure which is current fed and wherein the outer sheath of the concentric transmission line thereof which is used to drive the antenna forms one half of the half-wave dipole.

It is yet a further object of the invention to provide a half-wave airborne antenna in which the vehicle carrying the antenna is not an effective part of the radiating system.

It is again another object of the invention to provide an airborne antenna structure for radiating very low frequency energy wherein the ratio of antenna length to the size of the vehicle carrying the antenna is so great that the circuit may be considered a one terminal network.

These and other objects of this invention will become more clear from the specification which follows and the appended claims taken together with the accompanying figures in which:

FIGURE 1 is a schematic block diagram of a system involving the airborne antenna for very low frequencies according to this invention;

FIGURE 2 is a generalized schematic and graphic diagram of the antenna configuration of the invention;

FIGURE 3 is a graph of the voltage distribution on a classic center fed half-wave dipole in the manner employed on this invention;

FIGURE 4 is a detailed partially broken diagram of the antenna structure of this invention;

FIGURE 5 is a section 5—5 through the article in FIGURE 4;

FIGURE 6 is a section 6—6 through the antenna shown in FIGURE 4;

FIGURE 7 is a section 7—7 through the antenna shown in FIGURE 4;

Figure 8:
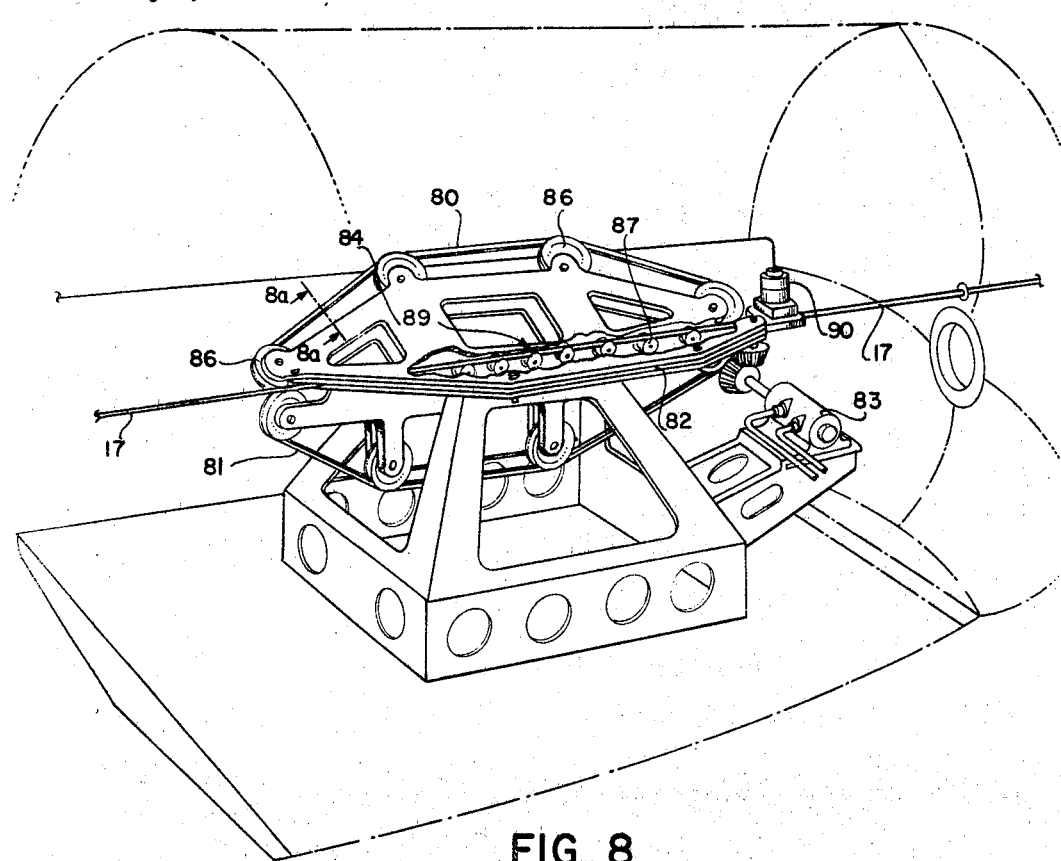
FIGURES 8 and 8a are detail diagrams of one of the reeling-in means shown partially in FIGURE 1 by which the antenna may be readily retracted into the aircraft.

Referring now to FIGURE 1, a generalized schematic block diagram of the system involved in this invention may be seen.

In FIGURE 1 a transmitter 10 is shown with an output 11 coupled to an antenna 12 according to this invention. Antenna 12 is reeled as shown schematically at 13 on a drum 14 driven by a motor 15. As it leaves the aircraft antenna 12–13 passes through a de-icing guide means 16. The very end of the antenna 17 has a drogue 18 attached to it which acts as a dragging airfoil to assist in maintaining the antenna in its horizontal or vertical configuration in these modes of operation of the antenna while the aircraft is airborne.

Modulating signals for the transmitter 10 are provided by a keyer 19 coupled to transmitter 10. The signals being keyed may result from a signal data storage system 20 or a manual input provided at 21. Data storage system 20 may derive its signals from a radio source received on data link 22. Data link 22 may be a ground-to-air ultra-high frequency link connected to data storage means 20. An antenna 23 connected to data link unit 22 receives the signal from the ground or sea surface.

The reling mechanism 14–15 is further described below in connection with the discussion of FIGURE 9.

In FIGURE 2 to which reference is now made, a coaxial transmission line 25 is shown which has an inner conductor 26 and a shell or outer conductor 25a. From the open end 28 of shell 25a, inner conductor 26 continues outside of the shell 25a as conductor 27.

Considered as an antenna element the length of the structure 25, 26, 27 between C and E of FIGURE 2 is ½ wavelength. The shielded or coaxial portion C–D is ¼ wavelength and the unshielded portion D–E is also ¼ wavelength. Thus a ½ wave dipole is formed in which a generator 29, 30 may be connected at A–B, A being connected to the closed end of shell 25a of coaxial transmission line 25 and B being connected to inner conductor 26. Generator 29, 30 is therefore within the sending end of coaxial element 25.

In FIGURE 3 a conventional half-wave dipole 34–36 is shown which is center fed by a generator A–B at D. The lengths C–D and D–E as above are ¼ wavelength. The voltage distribution curve of such a half-wave dipole is shown at 33–35. An identical voltage distribution curve may be seen to be present on the "dipole" antenna of FIGURE 2. The operation of the antenna configuration of FIGURE 2 can thus be seen to be the equivalent of a centerfed dipole such as that schematically illustrated in FIGURE 3, the radiating elements being the ¼ wave section D–E and the ¼ wave transmission line section C–D.

Since the impedance at the feed point of a centerfed dipole is 70 ohms and since the section of coaxial transmission line may be chosen such that it has a 70 ohms characteristic impedance, the antenna structure illustrated in FIGURE 2 connected in the manner described is therefore terminated in its characteristic impedance and so properly matched for optimum transmission therefrom. The antenna of FIGURE 2 is thereby adaptable to very low frequency transmission and despite considerable length show an extremely low transmission loss.

The implementation of an antenna structure according to this invention such as schematically illustrated in FIGURE 2 requires certain special considerations involving aerodynamic characteristics and weight of the antenna when considered for very low frequencies.

In a particular application of the antenna structure installed in an aircraft for transmission of radio waves at 30 kc. the antenna structure for ½ wavelength will be 16,000 feet in length. The coaxial portion therefore is 8,000 feet long and the unshielded portion 8,000 feet long. Obviously, even a good-sized aircraft will be but a very small fraction of a wavelength at this very low frequency and as illustrated in FIGURE 2 would provide a small enclosure on the end of C of the coaxial transmission line 25 within which the generator 29–30 of the very low frequency waves is contained.

In FIGURE 4 a physical antenna structure is illustrated which meets the requirements of the transmission of the very low frequency waves involved herein and has structural features adapted to aid the aerodynamic characteristics of the antenna when strung out behind an aircraft and also to minimize the weight thereof without reducing the electrical characteristics which are required.

In FIGURE 4 the antenna structure shown consists of a coaxial section 45, and an unshielded section 49–51. The central wire of the unshielded section is continuous with the central wire of the coaxial section as is further detailed in FIGURES 5, 6 and 7 to which reference is now made.

FIGURE 5 is a cross-section through 5–5 of FIGURE 4 wherein the structure of coaxial section 45 is shown to be made up of a central stranded copper wire 56, in an insulated space filled with a non-conducting material such as polyethylene foam 55. The foam 55 is covered with a shield material 54 spirally wound about it made of a relatively flexible low resistance metal such as beryllium copper wire which is provided to permit relatively easy rolling of the wire onto drums such as schematically indicated at 14 in FIGURE 1. An outer insulating sheath 53 of polyethylene encloses the shield 54.

At 47 in FIGURE 4 polyethylene sheath 53 joins polyethylene sheath 60 in section 49 of the antenna and central conductor 56 is spliced to a high tensile strength stranded steel wire 59 surrounded by a wrap of plurality of wires 58 of stranded aluminum. A higher tensile strength non-conducting material 64 such as fiberglass is substituted for the foam material 55 in the region of 47 to transfer tensile loads from 49 to 45. Wires 58 and 59 are a common conductor. The cross-section of the structure is shown in FIGURE 6. At 50 in FIGURE 4, stel wire 59 reduces in diameter to become conductor 63 and aluminum wires 58 reduce in diameter to become conductors 62 in section 51 of the antenna structure. The detailed cross-section of section 51 is shown in FIGURE 7. The steel wires 59 and 63 are one continuous conductor. The aluminum wires 58 and 62 are likewise continuous. The latter wrap about the former over the entire length of wire element 49–51.

In FIGURE 8 there is shown the means whereby an antenna structure such as shown in FIGURE 4 after being extended may be reeled back into an aircraft. Because of the drag of the wire 17 during flight, retrieval of wire 17 presents a severe strain thereon as it winds on drum 14 (FIGURE 1). Therefore, a novel structure as shown in FIGURE 8 is used to assist in the retrieval process and draw in the very long wire antenna with the least possible strain or deformation which would occur if the wire were reeled directly onto drum 14.

Figure 8A:
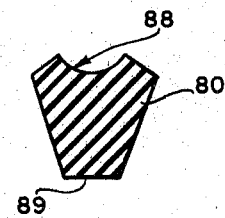

In FIGURE 8 the retrieval and braking assembly used in this invention is shown. The details of this assembly are the subject of a co-pending application of Harold Young, Ser. No. 202,348, entitled Cable Guide and Retrieval Mechanism, filed June 7, 1962, now Patent No. 3,240,413. The retrieval and braking assembly shown in FIGURES 8 and 8a corresponds to that shown at 16 in FIGURE 1 and consists of three endless belts located on axes 120° apart. The belts are grooved in the manner shown in the inset of belt 80, at 88 to accomodate antenna wire 17. (Wire 17 in FIGURE 8 corresponds to wire 17 of FIGURE 1.) The belt assembly is powered by a hydraulic motor 83. Each belt is approximately 15 feet in perimeter and applies pressure to the cable 17 passing through the grooves 88 of the belts to force the cable forward into the drum 14 (FIGURE 1) over a contact area 89 six feet in length. The belts 80, 81, 82 are guided and retained by twelve V-grooved pulleys such as 86 and thirty small pressure plate type pulleys such as 87. The pulleys are housed in a cast support structure 84 to position them so as to allow cable 17 to pass between the faces 88 of belts 80, 81, 82 forming in effect a long moving tube for cable 17. The complete assembly of the belts 80, 81, 82 hydraulic motor 83 and a guillotine 90 are on a common base. Guillotine 90 is provided to permit quick release of cable 17 in an emergency by chopping it off.

The pulling-in system shown in FIGURE 8 provides in effect a six foot long continuously moving tube formed by grooves 88 which grabs the antenna wire in the manner similar to the pulling device known as the "Chinese finger-lock."

Figure 9:
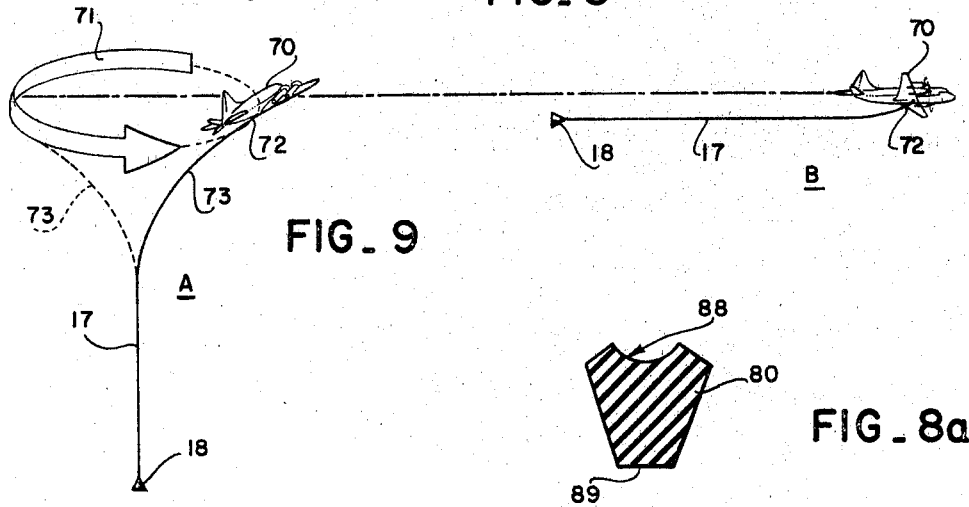
FIGURE 9 shows two modes of operation of the antenna when airborne.

In FIGURE 9 two views are shown of an aircraft trailing the antenna of this invention in two modes of operation thereof.

At A in FIGURE 9 an aircraft 70 trailing antenna 17 such as that in FIGURE 5 and a drogue 18 flying in a 10,000 ft. diameter circle indicated by arrow 71 will ultimately achieve the configuration of a vertical dipole antenna 17 hanging vertically from the aircraft as indicated at 74. Antenna 17 leaves aircraft 70 at 72 assuming an angle 73 for a distance from the antenna outlet 72 until vertical drop as at 74 is achieved. Drogue 18 acts as a balancing center as the aircraft flies its wide circle. The cone angle of antenna lead portion 73 is approximately 40° at a rotation rate of 1.3 G. when the craft travels at 165 knots. The cone angle will vary as the speed of aircraft 70 varies.

At B in FIGURE 9 the positions of drogue 18 and antenna 17 are shown in level flight of aircraft 70 to form a horizontal dipole radiator trailing behind aircraft 70.

The novel antenna structure defined in the foregoing specification has particular application for very low frequency wave (VLF) transmission. A particular use thereof is in long range VLF communication with submersible craft at sea. In the present method for such VLF communication a land-based antenna structure is usually strung for the requisite numbers of thousands of feet between towers or high points in the terrain. Such structures in military circumstances can be located by direction finding apparatus and are therefore undesirable.

Through the use of airborne structures in accordance with this invention the aircraft location will be easily moved from one place to another so that when a communication rendezvous has been concluded, the craft can either relocate with antenna trailing or reel-in its antenna and proceed to some new rendezvous point.

What is claimed as new is:

1. A very low frequency radiating system antenna structure comprising:
    (a) a quarter wave coaxial section;
    (b) a quarter wave linear section; and
    (c) an aerodynamic drogue;
    (d) said coaxial section having a central conductor and a conductive sheath insulated therefrom;
    (e) said quarter wave linear section comprising a first half of one outer diameter connected to said central conductor, and a second half continuous with said first half and of a smaller diameter than said first half connected by its free end thereof to said drogue; whereby when trailed behind an aircraft said antenna structure is aerodynamically supported by said drogue and maintained in a relatively horizontal orientation with respect to said aircraft.

2. A very low frequency half-wave dipole antenna structure comprising:
    (a) a coaxial radiating section, one-quarter wave long at the radiating wave length of said structure,
    (b) a single wire radiating section one-quarter wave long at the radiating wavelength of said structure connected to said coaxial section, consisting of a first conductor, one-eighth wave long at said radiating wavelength,
    (c) a second conductor one-eighth wave long at said radiating wavelength connected to said first conductor, and being a continuation of and having a smaller cross-section than the said first conductor.

3. In an aircraft, a very low frequency half-wave dipole antenna structure comprising:
    (a) a coaxial radiating section, one-quarter wave long at the radiating wave length of said structure;
    (b) a single wire radiating section one-quarter wave long at the radiating wavelength of said structure connected to said coaxial section, consisting of a first conductor, one-eighth wave long at said radiating wavelength and a second conductor one-eighth wave long at said radiating wavelength connected to said first conductor, and having a smaller cross-section than the first conductor; and
    (c) a drogue attached to the free end of said second conductor to act as an aerodynamic drag element for said antenna structure.

4. In a very low frequency radiating system, a very low frequency half-wave dipole antenna structure comprising:
   (a) a coaxial radiating section one-quarter wave long at the radiating wave length of said structure;
   (b) a single wire radiating section one-quarter wave long at the radiating wavelength of said structure connected to said coaxial section, consisting of a first conductor, one-eighth wave long at said radiating wavelength and a second conductor one-eighth wave long at said radiating wavelength connected to said first conductor, and being a continuation of said first conductor, and the first conductor attached to the coaxial radiating section and having approximately the same cross-section and the second conductor having a smaller cross-section than the first conductor;
   (c) a drogue attached to the free end of said second conductor to act as an aerodynamic drag element for said antenna structure; and a very low frequency wave generator in an aircraft; said antenna structure being connected to an output of said generator and trailed behind said aircraft in flight.

5. A very low frequency half-wave dipole antenna structure comprising:
   (a) a coaxial radiating section, one-quarter wave long at the radiating wave length of said structure, having a central inner conductor of predetermined diameter, and an outer conductive sheath insulated from said inner conductor, said sheath being closed at one end and open at the opposite end thereof;
   (b) a single wire radiating section one-quarter wave long at the radiating wavelength of said structure, consisting of a first conductor, one-eighth wave long at said radiating wavelength connected to said inner conductor at the open end of said sheath and comprising a first central steel wire conductor larger in diameter than said inner conductor and wrapped with a first plurality of aluminum wires of smaller diameter than said first steel wire and in contact with said central steel wire, and a second conductor one-eighth wave long at said radiating wavelength connected to said first central steel wire conductor, being a continuation of said first central steel wire conductor and comprising a second central steel wire conductor smaller in diameter than said first central steel wire, but larger than said inner conductor of said coaxial section, wrapped with a second plurality of aluminum wires of smaller diameter than said second steel wire and in contact with said second steel wire conductor, each respectively of said second plurality of aluminum wires being smaller in diameter than each of said first plurality of aluminum wires and each being respectively continuous therewith; and
   (c) a drogue attached to the remaining end of said single wire radiating section to act as an aerodynamic drag element for said antenna structure; whereby when said antenna structure is connected by said inner conductor thereof to the output of a very low frequency wave generator in an aircraft and trailed behind said aircraft in flight a very efficient very low frequency half-wave dipole radiator results, said drogue assisting in maintaining said antenna trailing behind said aircraft in a horizontal orientation.

6. In an aircraft a very low frequency half-wave dipole antenna structure comprising:
   (a) a coaxial radiating section, one-quarter wave long at the radiating wave length of said structure, having a central inner conductor of predetermined diameter, and an outer conductive sheath, said sheath being insulated from said inner conductor, closed at one end and open at the opposite end thereof, said closed end being continuous with the body of said aircraft;
   (b) a single wire radiating section one-quarter wave long at the radiating wavelength of said structure, consisting of a first conductor, one-eighth wave long at said radiating wavelength connected to said inner conductor at the open end of said sheath and comprising a first central steel wire conductor larger in diameter than said inner conductor and wrapped with a first plurality of smaller diameter aluminum wires in contact with said central steel wire, and a second conductor one-eighth wave long at said radiating wavelength connected to said first central steel wire conductor, being a continuation of said first central steel wire conductor and comprising a second central steel wire conductor smaller in diameter than said first central stel wire, but larger than said inner conductor of said coaxial section wrapped with a second plurality of smaller diameter aluminum wires in contact with said second steel wire conductor each of said second plurality of aluminum wires being smaller in diameter than each of said first plurality of aluminum wires and being continuous therewith; and
   (c) a drogue attached to the end of said second conductor to act as an aerodynamic drag element for said antenna structure; whereby when said antenna structure is connected by said inner conductor thereof to the output of a very low frequency wave generator in said aircraft said sheath connected to said body of said aircraft and said antenna is trailed behind said aircraft in flight, a very efficient very low frequency half-wave dipole radiator results.

7. In an aircraft a very low frequency wave transmitting system comprising:
   (a) a very low frequency wave signal generator having at least a pair of output terminals;
   (b) a very low frequency half-wave dipole antenna structure consisting of a coaxial radiating section, one-quarter wave long at the radiating wave length of said system and a single wire unshielded radiating section one-quarter wave long at the radiating wave length of said system, said coaxial section having a central inner conductor, and an outer conductive sheath insulated from said inner conductor, said sheath being closed at one end and open at the opposite end thereof, the end of said inner conductor nearest said closed end of said sheath being connected to one of said output terminals said closed end of said sheath being connected to the other of said output terminals, said single wire section being connected to the free end of said inner conductor; and
   (c) a drogue attached to the free end of said single wire section to act as an aerodynamic drag element for said antenna structure; whereby said generator effectively excites said antenna at the center of said dipole, said coaxial section acting both as a transmission line between said generator and the junction of said single wire with said coaxial section and as one half of said dipole.

8. In an aircraft, a very low frequency radiating system of great length comprising:
   (a) an antenna structure forming a half wave dipole consisting of a coaxial quarter wave section forming both one half of a radiator and a transmission line and a linear quarter wave section forming the second half of said radiator;
   (b) a reeling assembly including a drum adapted to receive said antenna structure and motive means coupled with said drum for reeling out and reeling in said antenna structure as required in the use thereof; and
   (c) a very low frequency wave transmitter connected to said antenna at said very low frequencies, the connection of said transmitter to said antenna structure being such that the shell of the aircraft is part of the shielding of said coaxial section to effectively enclose said transmitter in the sending end of the transmission line formed thereby.

9. An antenna structure for very low frequency waves for use in an aircraft containing a generator for the very low frequencies, said antenna comprising:
 (a) a first conductor having one end thereof connected to said generator in said aircraft;
 (b) a second conductor connected to said first conductor in an end to end relationship therewith; and
 (c) a shielding sheath coaxially disposed about the entire length of said first conductor and insulated therefrom; one end of said sheath being connected to the aircraft and the other end of said sheath being open and terminated adjacent the junction of said first and second conductors; whereby when said first conductor is excited by said generator said sheath and said second conductor radiate as a center fed half-wave dipole antenna.

10. The invention as defined in claim 9 including a drogue attached to the free end of said second conductor to act as an aerodynamic drag element for said antenna structure.

References Cited

UNITED STATES PATENTS

| 2,485,457 | 10/1949 | Potter | 343—791 |
| 2,986,733 | 5/1961 | Trilling | 343—707 |
| 2,036,456 | 4/1936 | Buschbeck | 343—723 |

RICHARD A. FARLEY, Primary Examiner

R. E. BERGER, Assistant Examiner

U.S. Cl. X.R.

343—723, 792